(12) United States Patent
Ho et al.

(10) Patent No.: US 8,726,214 B2
(45) Date of Patent: May 13, 2014

(54) FLOORPLANNING METHOD FOR AN ANALOG INTEGRATED CIRCUIT LAYOUT

(75) Inventors: Tsung-Yi Ho, Tainan (TW); Sheng-Jhih Jiang, Tainan (TW); Chan-Liang Wu, Tainan (TW)

(73) Assignees: NCKU Research and Development Foundation, Tainan (TW); Himax Technologies, Ltd., Tainan (TW)

( * ) Notice: Subject to any disclaimer, the term of this patent is extended or adjusted under 35 U.S.C. 154(b) by 80 days.

(21) Appl. No.: 13/540,520

(22) Filed: Jul. 2, 2012

(65) Prior Publication Data

US 2013/0283226 A1    Oct. 24, 2013

Related U.S. Application Data

(60) Provisional application No. 61/635,476, filed on Apr. 19, 2012, provisional application No. 61/656,225, filed on Jun. 6, 2012.

(51) Int. Cl.
*G06F 17/50* (2006.01)
(52) U.S. Cl.
USPC ........... 716/118; 716/110; 716/111; 716/119; 716/122; 716/123

(58) Field of Classification Search
USPC .......... 716/100, 110–111, 118–119, 122–125
See application file for complete search history.

(56) References Cited

U.S. PATENT DOCUMENTS

| | | | | |
|---|---|---|---|---|
| 5,309,371 A | * | 5/1994 | Shikata et al. | 716/121 |
| 5,416,720 A | * | 5/1995 | Fukui | 716/123 |
| 6,295,633 B1 | * | 9/2001 | Murakawa | 716/124 |

* cited by examiner

*Primary Examiner* — Paul Dinh
(74) *Attorney, Agent, or Firm* — Stout, Uxa, Buyan & Mullins, LLP; Donald E. Stout

(57) ABSTRACT

A floorplanning method for an analog integrated circuit layout is disclosed. A first-type block is defined as a movable and deformable block with rectangle constraint, and a second-type block is defined as a fixed-size block without rectangle constraint. Each block in the floorplan is classified to the first-type or the second-type block. In a shape determination stage, a target shape is determined among candidates of the first-type block, the first-type block accordingly being modified to the target shape, resulting in at least one overlap in the floorplan. In an overlap elimination stage, neighboring blocks of each said overlap are analyzed, the overlap being then eliminated by utilizing surrounding space, resulting in unused space in the floorplan. In an enlargement stage, the unused space is utilized for enlarging the first-type block.

10 Claims, 6 Drawing Sheets

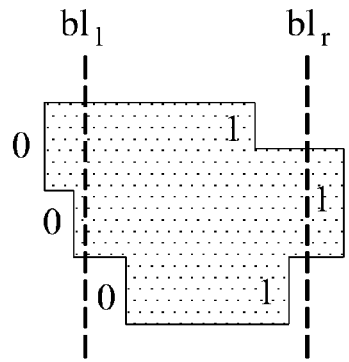
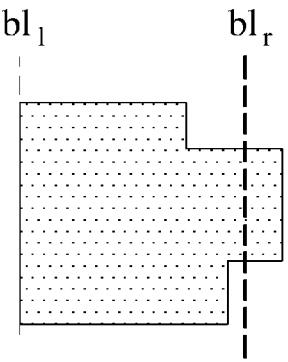
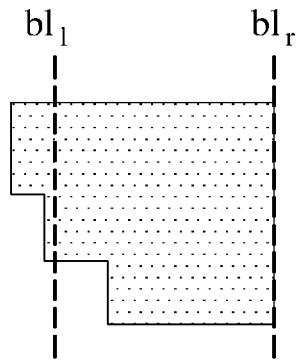
FIG.3A              FIG.3B              FIG.3C
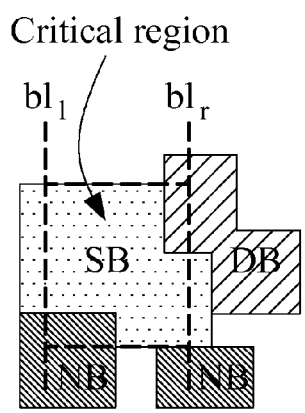
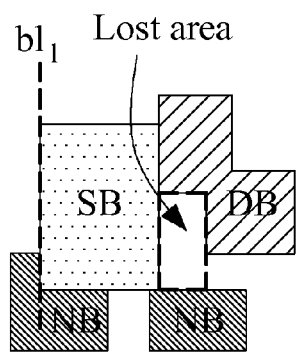
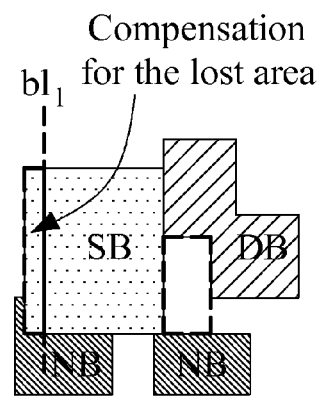
FIG.4A              FIG.4B              FIG.4C

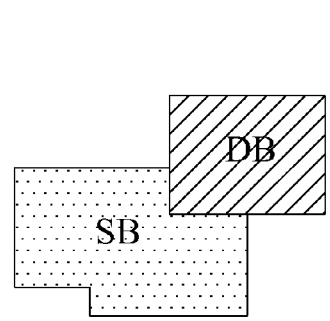
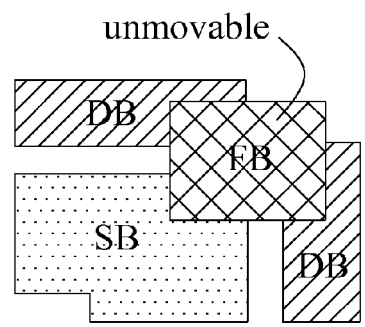
FIG.5A  FIG.5B
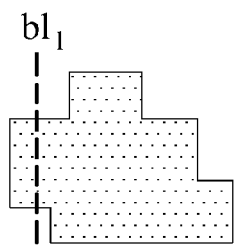
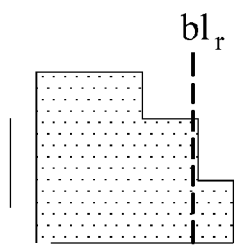
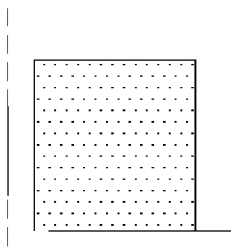
FIG.6A  FIG.6B  FIG.6C
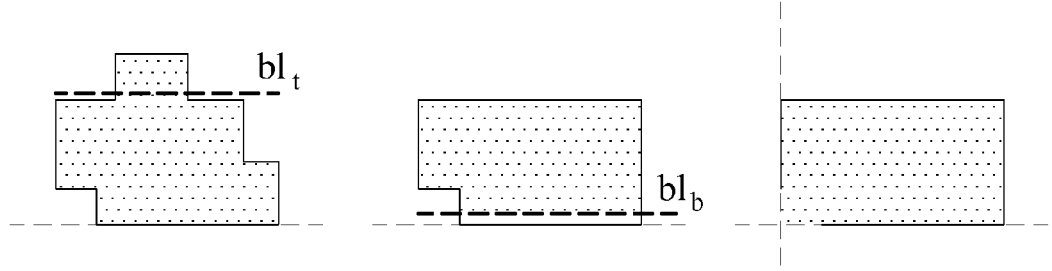
FIG.6D  FIG.6E  FIG.6F $L_{al} = \{d\}$
$L_{ar} = \{f\}$
$L_{at} = \{b,c\}$
$L_{ab} = \{e\}$

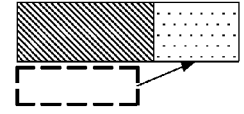
FIG.10G  FIG.10H
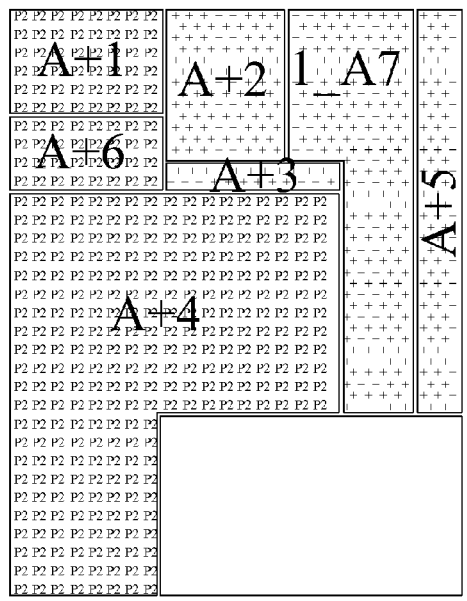
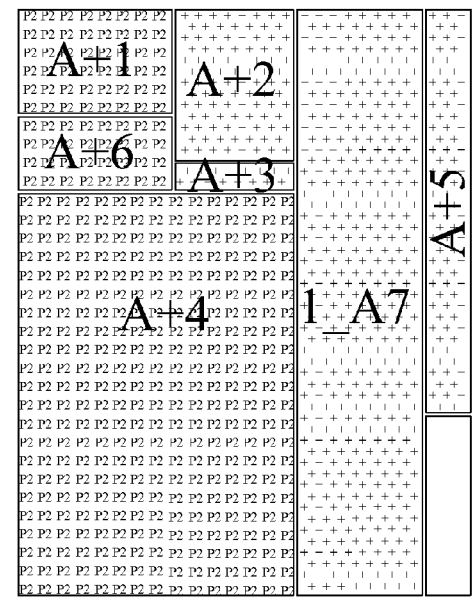
FIG.11A  FIG.11B

FLOORPLANNING METHOD FOR AN ANALOG INTEGRATED CIRCUIT LAYOUT

CROSS-REFERENCE TO RELATED APPLICATIONS

This application claims the benefit of U.S. Provisional Application No. 61/635,476, filed on Apr. 19, 2012 and entitled "Rapid Analog Prototyping Framework Using Incremental Floor Planning Technique", and U.S. Provisional Application No. 61/656,225, filed on Jun. 6, 2012 and entitled "Rapid Analog Prototyping Framework Using Incremental Floor Planning Technique", the entire contents of both which are hereby incorporated by reference.

BACKGROUND OF THE INVENTION

1. Field of the Invention

The present invention generally relates to an analog integrated circuit layout, and more particularly to a floorplanning method for an analog integrated circuit layout using incremental floorplanning technique.

2. Description of Related Art

In modern analog design flow, the designers usually reuse previous designed circuits to reduce the complexity of designing new circuits for fast floorplan prototyping. Once technology or design migration is required in the new circuits, several components will need to follow complicated constraints such as fixed location, fixed shape, or change shape from rectilinear to rectangular. It is difficult for designers to refine the floorplan manually because of the lack of automation tools for analog designs.

To deal with the analog migration problem, there are many difficulties and constraints we will face with. For example, due to the internal design change, the shape of components will be changed, too. Once the shape of components is modified, the neighboring components should be adjusted to reflect the modification. Therefore, the manual adjustment task is difficult and time consuming.

Further, the relative locations of all the components present in the floorplan, which we call component topology, are designed to satisfy important electrical features such as current flow and routing plan. Therefore, the component topology must be maintained in order to preserve the electrical features.

Moreover, there usually exist some components which were wrongly designed in previous products, and must be corrected in the new circuits. For example, components such as differential pairs are restricted to be rectangular for its internal device matching. If the differential pairs were designed in a rectilinear shape rather than a rectangular shape, it should be corrected in the new design. This means some components will be modified from rectilinear to rectangular to hold their internal circuit properties and we call this constraint as rectangle constraint. Because the size of the chip will be determined in the early stage, the whole migration process must be completed under fixed-outline constraint.

Researchers have proposed several works to handle a few of the above constraints. However, none of these works considers all the constraints simultaneously. Therefore, a need has arisen to propose a novel floorplanning method for an analog integrated circuit layout for fast floorplan prototyping to overcome the aforementioned disadvantages.

SUMMARY OF THE INVENTION

In view of the foregoing, the embodiment of the present invention provides a floorplanning method for an analog integrated circuit layout to improve the shapes of the blocks (RB and SB blocks) which are required to be adjusted from rectilinear blocks to rectangle blocks; to employ the unused space in the floorplan to enlarge specified blocks (SB blocks); and to maintain the component topology during the whole migration process in order to preserve the original circuit property and avoid the overhead for redesign.

According to one embodiment, a first-type block is defined as a movable and deformable block with rectangle constraint, and a second-type block is defined as a fixed-size block without rectangle constraint. Each block in the floorplan is classified to the first-type or the second-type block. A shape determination stage is performed to determine a target shape among candidates of the first-type block, the first-type block accordingly being modified to the target shape, resulting in at least one overlap in the floorplan. An overlap elimination stage is performed to analyze neighboring blocks of each said overlap, which is then eliminated by utilizing surrounding space, resulting in unused space in the floorplan. An enlargement stage is performed to utilize the unused space for enlarging the first-type block.

BRIEF DESCRIPTION OF THE DRAWINGS

FIG. 3A through FIG. 3C show an example demonstrating the balance line finding step of FIG. 2;

FIG. 4A through FIG. 4C show an example demonstrating the obstacle block checking step of FIG. 2;

FIG. 5A and FIG. 5B show two types of obstacle blocks;

FIG. 6A through FIG. 6I show some examples of obtaining a candidate of the target shape of an RB/SB block;

FIG. 10A to FIG. 10H show examples demonstrating the step of operations for overlap elimination of FIG. 8; and FIG. 11A and FIG. 11B show an example demonstrating the proposed framework of the embodiment.

DETAILED DESCRIPTION OF THE INVENTION

An embodiment of the present invention discloses a floorplanning method for an analog (or mixed-signal) integrated circuit layout for fast floorplan prototyping using incremental floorplanning technique. In the embodiment, five block types for modeling blocks with different constraints in a migration process are defined as follows:

DB type: a block with fixed shape (or size) to be placed on a fixed location and not be moved afterward. For example, I/O blocks are often placed on boundaries of a floorplan.

FB type: a block with fixed shape, but its location can be changed (i.e., be movable) in the migration process. For example, a bias generator is usually a movable block with fixed shape.

RB type: a movable block with fixed shape and required to be rectangular. For example, a differential pair is preferred to be a rectangle.

SB type: a movable block which is required to be adjusted, for example, from a rectilinear block to a rectangular block and probably to be enlarged in size. For example, a mixed-signal component is preferred to be enlarged and adjusted into a rectangle to provide more routing resource and reduce routing complexity.

NB type: a movable and deformable block with fixed size. For example, a component with low operating frequency such as a control circuit has high flexibility in its shape and location in the floorplan.

The five block types are summarized in the following Table 1:

TABLE 1

| Block type | Movable | Deformable | Fixed area | Rectangle constraint |
|---|---|---|---|---|
| DB | | | . | |
| FB | . | | . | |
| RB | . | . | . | . |
| SB | . | . | | . |
| NB | . | . | | |

Figure 1:
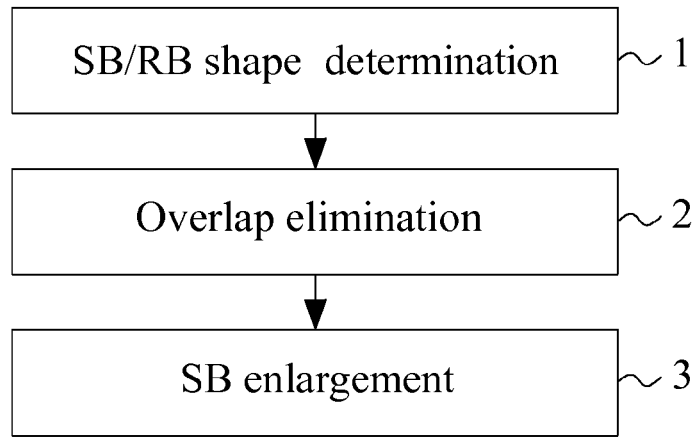
FIG. 1 shows a flow diagram generally illustrating a floorplanning method for an analog integrated circuit layout according to one embodiment of the present invention.

FIG. 1 shows a flow diagram generally illustrating a floor-planning method for an analog integrated circuit layout according to one embodiment of the present invention. In stage 1, target shapes of the RB and/or SB blocks are determined among their candidates and are then modified to their target shapes. Due to the modifications of RB and SB blocks, overlap will ordinarily appear in the floorplan. Subsequently, in stage 2, neighboring blocks of each overlap are analyzed. Accordingly, the overlap will be eliminated by utilizing its surrounding space. Finally, in stage 3, there may exist unused space in the resulting floorplan, and the unused space may be utilized for enlarging SB blocks.

With the above five block types and their corresponding constraints, each block in the initial floorplan prototype that is produced by reusing components in previous products, is classified to the preferred block type for advancing migration. Moreover, a relax pair is further defined below to provide flexibility during the migration progress:

Definition: a relax pair (i, j, p) represents that block i may be relocated to the p side of block j, where p is left, right, top or bottom.

According to the definition of relax pair, we can change the relative positions of blocks which are given in the relax pair. Let B denote all the n blocks that include rectangular and rectilinear blocks in the initial floorplan F. Each block i ($1 \leq i \leq n$) has area $A_i$. Let $(x_{ij}, y_{ij})$ ($1 \leq j \leq m$) denote the coordinate of jth corner point of block i with m corners. Given an initial floorplan F with width W and height H, a block set B, and relax pairs R, all the blocks in B are marked as one of the five block types (DB, FB, RB, SB or NB). The objective of the embodiment is to produce a migrated floorplan F' by adjusting the RB and SB blocks in F from rectilinear to rectangular and enlarging the size of SB blocks under fixed-outline constraint. Additionally, in the migrated F', the component topology in F is also preserved excepting the blocks in R during the whole migration process. Therefore, the designed circuit features such as current flow and routing plan will not be changed and the overhead for redesigning the circuit may be avoided.

Figure 2:
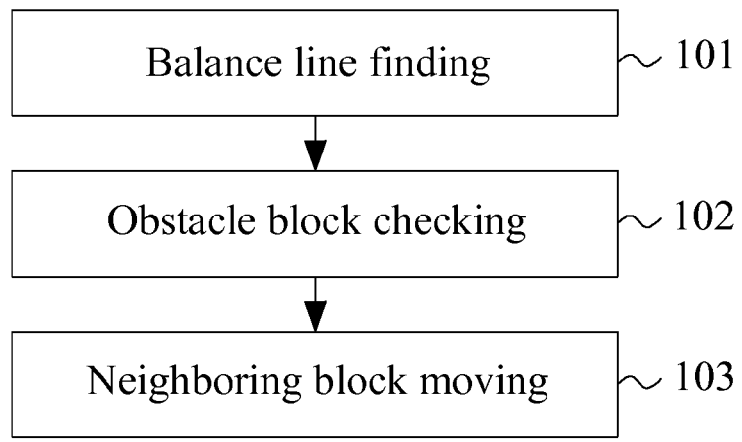
FIG. 2 shows a detailed block diagram of the SB/RB shape determination stage of FIG. 1.

FIG. 2 shows a detailed block diagram of the SB/RB shape determination stage of FIG. 1. In step 101, different moving orders are determined for obtaining candidates of a target shape of the SB/RB block. A moving order is an order to move edges on different sides. As exemplified in FIG. 3A to FIG. 3C, the moving order is left, right, which means left-side edges are first moved and then right-side edges are moved. As shown in FIG. 3A, vertical edges with mark "0" represent the left-side edges and vertical edges with mark "1" represent the right-side edges. After deciding a moving order, a balance line should be determined on the specified sides in the moving order. That is, the four balance lines of its left-side, right-side, top-side and bottom-side edges need be found to obtain the candidates. The left-side, right-side, top-side, and bottom-side balance lines are called as $bl_l$, $bl_r$, $bl_t$ and $bl_b$, respectively. In the specification, a balance line of one side of a block means that if all the edges on the specified side are moved to the location of the balance line, the difference of area before and after the edge moving is zero. As exemplified in FIG. 3B, area is consistent after all left-side edges are moved to the left-side balance line $bl_l$, and as exemplified in FIG. 3C, area is consistent after all right-side edges are moved to the right-side balance line $bl_r$. All the left-side vertical edges of an RB/SB block are collected as $E_l$. Because the area of RB/SB block must be consistent before and after all the edges in $E_l$ move to the $bl_l$, the location $x_{bl\_l}$ of $bl_l$ may be obtained as follows:

$$\Sigma_{i \in El}(x_i - x_{bl\_l}) * l_i = 0$$

where $x_i$ denotes the x coordinate of edge i in $E_l$, $l_i$ denotes the length of edge i, and $x_{bl\_l}$ denotes the x coordinate of $bl_l$.

Subsequently, in step 102, for each moving order, it is checked whether there is any obstacle block that exists in a critical region to obtain the candidate. Then, the target shape of the RB/SB block may be determined by the overlap area of the candidates and the block is then changed to the selected target shape. FIG. 4A through FIG. 4C show an example demonstrating the obstacle block checking step of FIG. 2. As shown in FIG. 4A, one of the candidates of the SB block is obtained by moving left-side edges to $bl_l$ and then moving right-side edges to blr. Before moving all the edges to the corresponding balance lines to obtain the candidate, it is scanned whether there is any obstacle block exists in the critical region which is bounded by the balance lines of the moving order and the outermost edges of other sides. In the embodiment, following cases are considered while checking the obstacle block:

DB block: DB blocks are unmovable and fixed-shape. Once a DB block is located on the critical region, the edges are unable to be moved to the balance lines. (FIG. 5A)

DB-like block: Although all the block types except DB are movable, in some cases, a movable block will become unmovable when it is bounded by floorplan boundaries or DB blocks. (FIG. 5B)

Once obstacle blocks appear in the critical region, the edges which will meet the obstacle blocks on the way to its balance line to the obstacle block are first moved. Then, other edges without obstacle blocks to the corresponding balance line are moved. Finally, because the obstacle block will cause some difference of area, we compensate the difference of area on the side without obstacle blocks. As exemplified in FIG. 4B, right-side edges are first moved to $bl_r$, which cause some area lost; and then the left-side edges are moved to compensate the lost area (FIG. 4C). In addition, it should be noted that if there are obstacle blocks on each side of the moving order, we will abandon the candidate. This is because that it may be impossible to move any edge for compensating the difference of area.

Figures 6G, 6H, 6I:
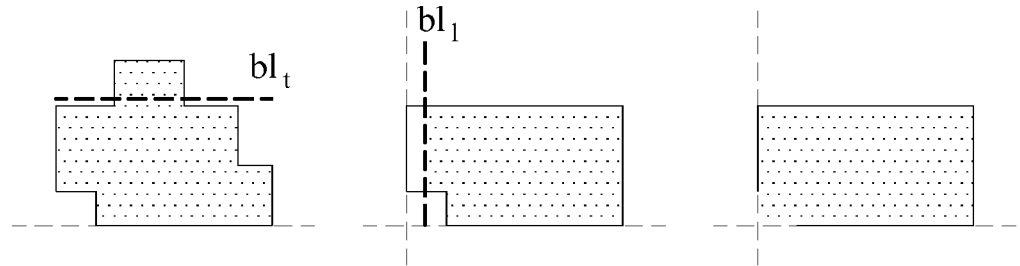

Otherwise, if there is no obstacle block in the critical region, we can easily obtain candidates of the target shape of an RB/SB block by moving the edges in the given moving order. FIG. 6A through FIG. 6I show some examples of obtaining a candidate of the target shape of an RB/SB block. FIG. 6A to FIG. 6C show a process for obtaining a candidate by moving left-side edges and then moving right-side edges; FIG. 6D to FIG. 6F show a process for obtaining a candidate by moving top-side edges and then moving bottom-side edges; and FIG. 6G to FIG. 6I show a process for obtaining a candidate by moving top-side edges and then moving left-side edges. After obtaining all the candidates of an RB/SB block, the candidate which has less overlap with its neighboring blocks is selected as its target shape, and its shape is changed to the selected target shape.

Figures 7A, 7B, 7C:
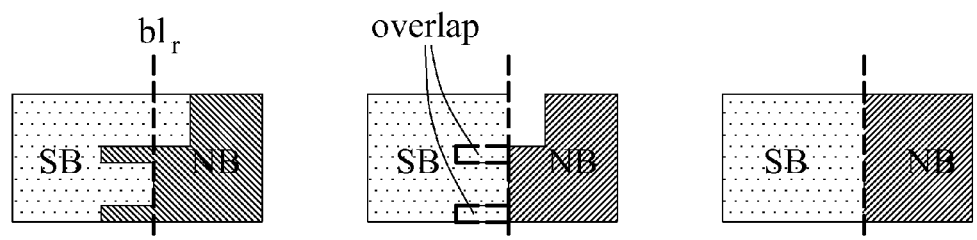
FIG. 7A to FIG. 7C show an example demonstrating the neighboring block moving step of FIG. 2.

In step 103, while the block is being changed, the neighboring block of the moving edge is properly adjusted in order to decrease the amount of overlap and preserve the component topology. As shown in FIG. 7A to FIG. 7C, if the neighboring block of the moving edge is deformable, they may be adjusted simultaneously to avoid the occurrence of overlap. Specifically, FIG. 7A shows a case before the right-side edges are moved to $bl_r$. FIG. 7B shows a case in which an SB block is changed without processing its neighboring NB block, and FIG. 7C shows a case in which an SB block and the neighboring NB block are changed simultaneously. Moreover, after the edges are moved to its balance lines, space will be left out between the moved edge and its neighboring block. It is probable that the space will be occupied by other blocks in the following overlap elimination stage 2. If this situation occurs, the relative locations among the RB/SB block and its neighboring blocks will be broken. Thus, in order not to change the component topology, the neighboring blocks should be moved toward the changed RB/SB block.

Figure 8:
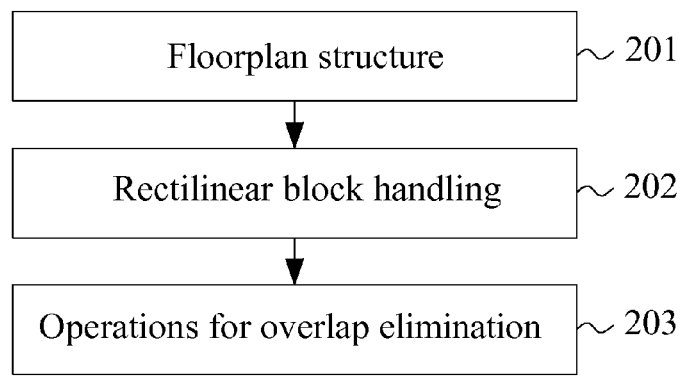
FIG. 8 shows a detailed flow diagram of the overlap elimination stage 2 of FIG. 1.
Figure 9A:
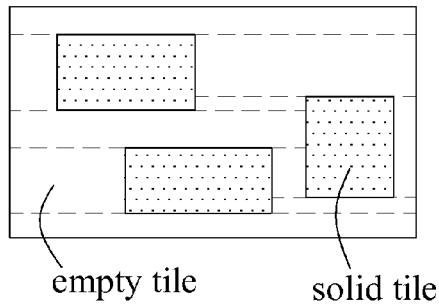
FIG. 9A to FIG. 9C show an example demonstrating the floorplan structure step of FIG. 8.
Figure 9B:
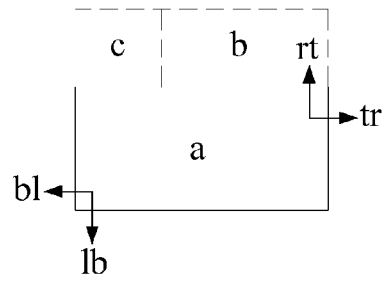
Figure 9C:
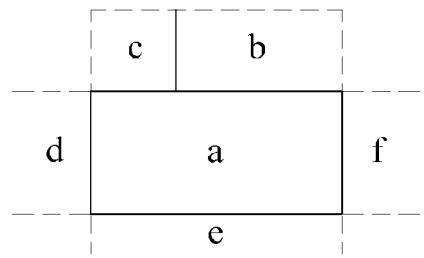

FIG. 8 shows a detailed flow diagram of the overlap elimination stage 2 of FIG. 1. In step 201, the whole floorplan is horizontally partitioned into tiles for handling the information of the floorplan. Tiles occupied by blocks are solid tiles and tiles filled by space are empty tiles (see FIG. 9A). There are four pointers at the corners of each tile, which are called corner stitches. As shown in FIG. 9B, the four pointers rt, tr, bl, and lb will point to the rightmost top, the topmost right, the bottommost left, and leftmost bottom neighboring tiles respectively. To obtain all the information of the tiles on the top side of tile a, we should first start from the tile a and then go to tile b by the rt pointer of tile a and go to tile c by the bl pointer of tile b. It should be noted that we must simultaneously check whether tile b and tile c are actually near to tile a without midway tile. In order to move the edges of blocks, we need to obtain all the neighboring tiles of the edge efficiently. Thus, we maintain the neighboring tiles of tile i by four neighbor lists $L_{i\_l}$, $L_{i\_r}$, and $L_{i\_b}$. As shown FIG. 9C, each list is consisted of all the neighboring tiles on the corresponding side of tile i. With the geometry information and the neighbor lists in the tile structures of the floorplan, we can easily collect the surrounding information of each block.

In step 202, all the edges for fast operating are classified. For a block i, all the left-side edges are collected as $E_{i\_l}$, all the right-side edges as $E_{i\_r}$, all the top-side edges as $E_{i\_t}$, and all the bottom-side edges as $E_{i\_b}$. With these edge sets, we can speed up the operations on rectilinear blocks. For instance, if we want to move a rectilinear block to left, we can just check the neighboring blocks which are near to edges in $E_{i\_l}$ without checking all the edges of the rectilinear block. In one specific embodiment, for a block i, we first collect all the edges as edge set $E_i$. Second, for each edge e in $E_i$, we find the edges $E_v$ which are overlapping with e in vertical direction and left to e. Third, we check the number of edges in $E_v$, if $E_v$ is consisted of even number of edges, we classify e as a left-side edge. Otherwise, e is classified as a right-side edge. Finally, we use the similar procedure to find out the $E_{i\_t}$ as well as $E_{i\_b}$ and then the whole edge classify task is completed.

Figure 10A:
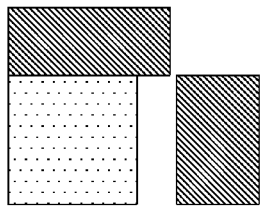
Figure 10B:
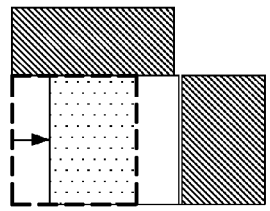
Figure 10C:
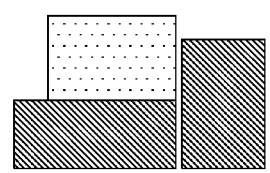
Figure 10D:
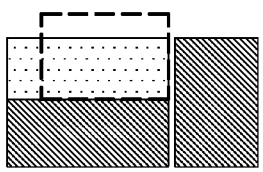
Figure 10E:
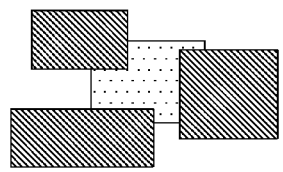
Figure 10F:
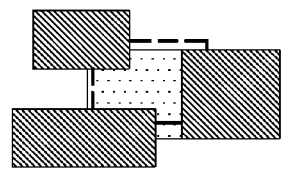

In step 203, the following four operations are employed to eliminate overlaps:
  Moving: For a movable block, the block is just moved to the specific direction without changing its shape. (FIG. 10A to FIG. 10B)
  Shaping: For a soft rectangular block, its aspect ratio is modified to change its shape. (FIG. 10C to FIG. 10D)
  Deforming: For a deformable rectilinear block, the edges are moved to utilize the surrounding space. It should be noted that the total area should be fixed which means that some edges will be pushed out and then some edges will be pushed back to keep the total area consistent. (FIG. 10E to FIG. 10F)
  Relax pair changing: While the elimination process, if a block is listed in a relax pair, the block is changed to the user-defined location in the relax pair. As shown in FIG. 10G through FIG. 10H, while the block is moved to the specified location, the aspect ratio need be changed in order not to induce additional overlaps.

In the SB enlargement stage 3 of FIG. 1, if space exists in the floorplan, the space will be further utilized to enhance the floorplan. To reduce the complexity of the internal routing in the SB block, the space in the floorplan is employed to enlarge the area of SB blocks. With the additional area, the routability and the quality of the circuit in SB blocks will be enhanced. Particularly, the embodiment employs both the near space and non-near space to enhance the space utilization in the SB enlargement stage 3. Moreover, the SB enlargement stage 3 can obtain higher space utilization by operating on rectangular and rectilinear blocks simultaneously.

According to the embodiment as discussed above, a shape determination procedure has been proposed to efficiently obtain the target shape of each RB and SB block, and the proposed framework produces a migrated floorplan satisfying the designed migration setting by simultaneously considering component topology and fixed-outline constraints. FIG. 11A and FIG. 11B show an example demonstrating the proposed framework of the embodiment. FIG. 11A is a floorplan prototype obtained by reusing components in previous products. The block 1_A7 was preferred to be adjusted to a rectangle and enlarged in the new design, which means that it is marked as an SB block. After applying the embodiment, the block 1_A7 will be adjusted from a rectilinear to a rectangle and the area of block 1_A7 is also enlarged.

Although specific embodiments have been illustrated and described, it will be appreciated by those skilled in the art that various modifications may be made without departing from the scope of the present invention, which is intended to be limited solely by the appended claims.

What is claimed is:

1. A floorplanning method for an analog integrated circuit layout, comprising a computer configured to perform the following steps:
  defining a first-type block as a movable and deformable block with rectangle constraint, and a second-type block as a fixed-size block without rectangle constraint;
  classifying each block in a floorplan to the first-type or the second-type block;
  a shape determination step for determining a target shape among candidates of the first-type block, the first-type block accordingly being modified to the target shape, resulting in at least one overlap between blocks in the floorplan;

an overlap elimination step for analyzing neighboring blocks of each said overlap, which is then eliminated by utilizing surrounding space; and an enlargement stage step for utilizing unused space for enlarging the first-type block;

wherein the shape determination step comprises:

deciding a moving order and determining balance lines on specified sides in the decided moving order such that an area of a block after all edges are moved to the balance lines is consistent with an area of the block before moving the edges to the balance lines;

for each said moving order, checking whether there is an obstacle block; and moving a neighboring block of the moving edge in order to decrease an amount of overlap and preserve component topology that defines relative locations of blocks present in the floorplan.

2. The method of claim 1, wherein the first-type block comprises:

an RB block being defined as a block with fixed size; and an SB block being defined as a block without fixed size.

3. The method of claim 2, wherein the second-type block comprises:

a DB block being defined as a block to be unmovable;

an FB block being defined as a block to be movable; and an NB block being defined as a block to be movable and deformable.

4. The method of claim 2, wherein the enlargement step comprises a step of enlarging the SB block by employing space in the floorplan.

5. The method of claim 1, if the obstacle block is assuredly checked, further comprising a step of compensating difference of area on a side without the obstacle block.

6. The method of claim 1, wherein the overlap elimination step comprises:

horizontally partitioning the floorplan into tiles, according to which information surrounding each said block in the floorplan is collected;

classifying all the edges; and eliminating the overlaps.

7. The method of claim 6, wherein the step of eliminating the overlaps comprises:

a moving operation by which a movable block is just moved to a specific direction without changing its shape.

8. The method of claim 6, wherein the step of eliminating the overlaps comprises:

a shaping operation by which aspect ratio of a soft rectangular block is modified to change its shape.

9. The method of claim 6, wherein the step of eliminating the overlaps comprises:

a deforming operation by which edges of a deformable rectilinear block are moved to utilize surrounding space.

10. The method of claim 6, wherein the step of eliminating the overlaps comprises:

a relax pair changing operation by which the block is changed to a user-defined location in a relax pair if the block is listed in the relax pair;

wherein the relax pair (i, j, p) represents that a block i is relocated to a p side of a block j, where p is left, right, top or bottom.

* * * * *